United States Patent [19]

Wiener

[11] 4,378,660
[45] Apr. 5, 1983

[54] METHOD OF AND MEANS FOR GRINDING PAIRS OF GEAR WHEELS AS SPIRAL OR CURVED TOOTHED BEVEL GEAR WHEELS

[76] Inventor: Dieter Wiener, 9 Tulpenstrasse, D-7505 Ettlingen-Bruchhausen, Fed. Rep. of Germany

[21] Appl. No.: 205,252

[22] Filed: Nov. 10, 1980

Related U.S. Application Data

[63] Continuation-in-part of Ser. No. 104,071, Dec. 17, 1979, abandoned, which is a continuation of Ser. No. 904,883, May 11, 1978, abandoned.

[30] Foreign Application Priority Data

May 11, 1977 [DE] Fed. Rep. of Germany ....... 2721164
Nov. 10, 1979 [DE] Fed. Rep. of Germany ....... 2945483

[51] Int. Cl.$^3$ .............................................. B24B 19/00
[52] U.S. Cl. ..................................... 51/56 G; 51/287; 409/53
[58] Field of Search ................... 51/54, 55, 56.6, 52 R, 51/119, 120, 287; 409/25, 31, 48, 52, 53

[56] References Cited

U.S. PATENT DOCUMENTS

| | | | |
|---|---|---|---|
| 1,676,371 | 7/1928 | Wildhaber | 51/287 |
| 2,164,978 | 7/1939 | Wildhaber | 51/287 X |
| 2,183,759 | 12/1939 | Wildhaber | 51/56.6 X |
| 2,334,366 | 11/1943 | Wildhaber | 51/287 |
| 2,633,775 | 4/1953 | Wildhaber | 409/53 X |
| 2,794,302 | 6/1957 | Deakin | 51/56.6 |
| 3,127,709 | 4/1964 | Waguri | 51/287 X |
| 3,213,567 | 10/1965 | King et al. | 51/287 X |
| 3,444,655 | 5/1969 | Apitz | 51/287 |

FOREIGN PATENT DOCUMENTS 852030 8/1952 Fed. Rep. of Germany .

Primary Examiner—Stephen G. Kunin
Assistant Examiner—Robert P. Olszewski
Attorney, Agent, or Firm—Antonelli, Terry & Wands

[57] ABSTRACT

A method and apparatus for grinding pairs of gear wheels such as spiral or curved tooth bevel gear wheels whereby a first wheel is ground with a male cup-type grinding tool and a second, counter wheel is ground with a female cup-type grinding wheel with an additional eccentric cyclic motion being applied to one of said wheels. In accordance with a preferred feature of the invention, the grinding tools utilized are not exactly complementarily congruent, the female tool differing by an amount that is equal to the amount of the additional eccentric cyclic motion that is effective in the direction of the tooth normal. The additional eccentric motion is preferably elliptical and in accordance with an apparatus aspect of the invention a drive is provided for achieving such elliptical supplementary motion. This drive is preferably characterized by a rod of specific length that is swingably borne and rotatably driveable at one end, about a rod axis that is stationary on the device (corresponding to the grinding axis when there is no supplementary motion), while at the other end of the rod there is a pivot arm of specific pivot length that is swingably and rotatably borne about a pivot axis (that consequently moves with reference to the machine frame), the grinding axis being guided by the free end of the pivot arm.

21 Claims, 17 Drawing Figures

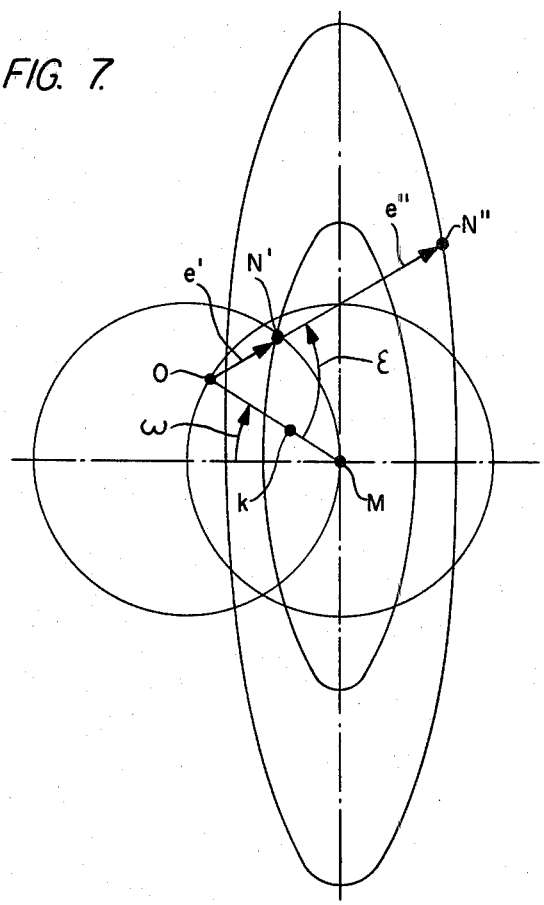
FIG. 7.
FIG. 6a.
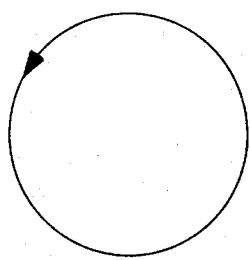
FIG. 6b.
FIG. 6c.
FIG. 6d.
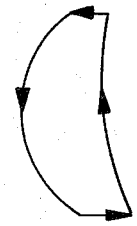
FIG. 6e.
FIG. 6f.
FIG. 6g.
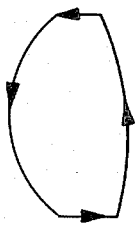

METHOD OF AND MEANS FOR GRINDING PAIRS OF GEAR WHEELS AS SPIRAL OR CURVED TOOTHED BEVEL GEAR WHEELS

BACKGROUND AND SUMMARY OF THE INVENTION

This application is a continuation-in-part of U.S. patent application Ser. No. 104,071, filed Dec. 17, 1979, now abandoned which in turn is a continuation of now abandoned Ser. No. 904,883, filed May 11, 1978 abandoned.

The invention is concerned with a method of and a means for grinding pairs of spiral or curved tooth bevel gears in the gear generating process, in which the teeth of one of the gears are produced by grinding the flanks at the two sides of a tooth gap by a cup wheel having two mutually outwardly facing grinding flanks and which form a bevelled outer ring.

During the grinding of gear wheels by the gear generation procedure, the gear wheel to be ground, on the one hand, and the grinding disc, on the other hand, describe synchronized movements with respect to each other, the movements being coupled together through the driving train of the gear grinding machine. After each gear generating procedure, in which one or two tooth flanks are ground, the gear wheel is indexed forward, and a further gear generating procedure is carried out, until all tooth flanks have been machined.

While grinding finds widespread use for spur gears, grinding of bevel gears has hitherto been used only to a small extent. This is mainly due to the high cost of grinding and to the lack of a suitable grinding procedure. It is true that bevel gears with straight and oblique teeth can be ground, but no grinding procedure is known by which spiral-tooth bevel gears can be satisfactorily ground. Many applications of spiral-toothed bevel gears are particularly desirable, since they have a large jump overlap and can be manufactured by suitable design in such a manner that under load the bearing surface wanders only slightly, while with single sided positioned straight- and oblique-toothed bevel gears the bearing surface under load wanders from the inner to the outer end of the tooth. As a result of their low sensitivity to displacement and the favorable jump overlap, spiral-toothed bevel gears have especially favorable noise properties.

In procedures of the type described, which have become known in practice, both wheels of each gearwheel pair (wheel or pinion and counter wheel or gear) are machined with cup wheels which have two conical grinding flanks and which are located in one tooth gap during grinding. The grinding flanks are thus turned away from each other and form a conical outer ring, which projects concentrically to the axis of rotation of the grinding disc from a plane which is orthogonal to the axis of rotation. It is true that accurately meshing pairs of gears can be produced by this method, but only after considerable expenditure of time, because expensive and complicated control procedures are necessary. Both flanks of each tooth gap of a wheel can be ground in one operation by means of this known procedure. But for the counter wheel each flank must be matched to the corresponding flank of the wheel. This necessitates the carrying out of two operations under expensive control with a correspondingly high expenditure for measuring and control equipment. If, on the other hand, both toothed wheels of a pair are ground in one operation, then on at least one tooth flank the bearing region (known as contact surface) does not lie in the center of the tooth flank, but at the edge of the tooth (known as edge contact).

The object of the invention is to provide a method of and means for grinding the tooth flanks of the counter wheel (to a previously ground gear wheel) in one operation and without expensive control procedures, so as to be an exact fit with the teeth of the wheel.

This object is attained in accordance with the invention, by the formation of the teeth of the other bevel gear (counter wheel) by the simultaneous grinding of the flanks on the two sides of one tooth by means of a cup wheel having two grinding flanks which are inclined towards each other and form a conical inner ring. Thus, as hereinproposed the wheel and the counter wheel are machined by different cup wheels. While one of the cup wheels has, an explained, grinding flanks which are inclined away from each other, (that is to say mutually outwardly facing), and form a conical outer ring, the counter wheel is machined by a cup wheel of which the grinding flanks are inclined towards each other, (that is to say mutually inwardly facing), and in effect form a hollowed-out conical inner ring concentric with the axis of rotation of the grinding disc, in a plane orthogonal to the axis of rotation. The invention is based on the appreciation that when grinding the gear teeth by reference to the tooth gap as in the prior art, due to the geometry of the tooth arrangement, during grinding of the counter wheel in one operation only one of the two tooth flanks of each tooth gap (therefore only the left or only the right hand flank) can be so ground that the direction of its flank agrees with that of the corresponding flank of the wheel which has already been ground, and therefore meshes accurately with it. The solution of the problem in accordance with the invention consists essentially of carrying out the grinding procedure accurately symmetrically for wheel and counter wheel, in that the counter wheel is ground by a cup wheel of which the contour is complementary but preferably slightly different (i.e. not exactly congruent, but varying by an amount of secondary movement effective in the direction of the tooth normal) to that of the cup wheel which grinds the wheel itself. The axes of the two cup wheels naturally coincide in their position with respect to the teeth to be ground.

According to a preferred feature, the cup wheel is subjected to an additional or secondary motion, cyclic in nature and of small eccentricity (for example 0.25 mm) during grinding. Such an additional motion can be effected, for example, by moving the axis of rotation of the grinding disc parallel to itself in an orbit, by means of an eccentric bearing box, for example. An analysis of the conditions shows that the additional eccentric motion influences the curvature of the concave tooth flanks differently from the curvature of the convex tooth flanks. In consequence of this a wide convexity is produced, which leads in an advantageous manner to a limited lateral bearing surface with the consequence that within certain limits displacements of the axes of the gear wheels meshing with each other can be permitted.

During rotation of the grinding disc under simultaneous cyclic motion, the outer flank is ground during the outwards part of this additional cyclic motion, and the inner flank of a tooth gap is ground during the inwards part, so that the corresponding flanks of the counter wheel can be machined in the same manner in one grinding procedure. By corresponding choice of the diameter of the grinding disc on the one hand, and of the diameter of the cyclic curve followed by the grinding disc on the other hand, the wheel and the counter wheel can be ground so as to give optimum fit together. In particular, there is also the advantageous possibility of machining one of the wheels of a pair, in general the one with the larger number of teeth (i.e. the so-called rim gear) by form-grinding, but machining the pinion in accordance with the above-named procedure.

Thus, the invention relates to a device for grinding arcuate toothed bevel gears in a part forming or part rolling process, with a drivable cup grinding disc rotatable about a grinding axis, whereby a cyclic supplementary motion is imparted to the grinding axis on a closed trajectory.

In grinding toothed bevel gears with teeth that run in an arc, the work is generally done with cup grinding discs whose grinding flanks are constituted by an inner and an outer conical surface. In part roll grinding, the workpiece and the rotating cup grinding disc are rolled together, whereby the flanks of the teeth are generated according to known laws of proportion. Whereas at least for grinding the gear a pair of arcuate toothed bevel gears is regularly worked in the roll process, the appurtenant plate wheel can often be worked more simply by form grinding, whereby the cup grinding disc in general may also present bevel surfaced grinding flanks produced by straight pieces. In any case, after the working of a tooth or of a gap between the teeth, the workpiece is further divided and correspondingly the next tooth or the next tooth gap is worked. The grinding flanks of the cup grinding plate in customary work processes constitute a conical outer ring that projects from the face, and therewith allow simultaneous working of the two tooth flanks that define a gap between teeth. As noted in the cited parent applications and the corresponding German application upon which they claim priority (now DE-PS No. 27 21 164), cup grinding discs can be made for the grinding of arcuate tooth bevel gears in the part form or part roll process in such a way that the grinding flanks form a conical inner ring sunk in the face of the cup grinding plate, to allow simultaneous working of both flanks of a tooth. If in particular one gear of a pair of gears is ground with, as previously noted, a cup grinding disc with a conical outer ring and the appurtenant counter gear is ground with a cup grinding disc with a conical inner ring, there is the possibility of grinding both gears of the pair in a single passage, without cumbersome processes of measurement and adjustment.

In devices of the described species, it is known (U.S. Pat. No. 3,127,709) that a cyclic supplementary motion on a closed trajectory can be imparted to the grinding axis. The supplementary motion usually occurs, also in the scope of the present invention, with a substantially smaller stroke as opposed to the normal roll motion, and with a substantially greater frequency, with the result that the produced tooth flanks represent an envelope section with a plurality of passages of the cyclic supplementary motion. With this supplementary motion in known devices there is first a reduction of grinding calcining and therewith the possibility of working with higher metal removal efficiencies. In addition, it was pointed out (in the cited parent applications and their German counterpart) that by the supplementary motion a certain amount of sphericity of the tooth flanks can be attained which is advantageous in consideration of assembly tolerances and load behavior in operation. The trajectory of the cyclic supplementary motion in this device is circular and composed of arc sections and straight sections.

With this device it is true that a certain sphericity can be attained whereby practical tolerances for assembly, and in operating conditions an edgewise bearing of the gears can be acceptably avoided. There are certain disadvantages however. On the one hand, a change of the curvature caused by the supplementary motion is generally possible only with a detectable influencing of tooth thickness in the teeth that are ground. On the other hand, it seems to be worth an effort, to get an improvement with respect to load and noise behavoir. In toothed gears ground with the known device, in the no-load state the expansion of the bearing diagram is slight, so that as a consequence of discontinuity overlap there are still relatively loud running noises that have a particularly disagreeable effect, particularly in the no-load state—in cars, for example, in idling. On the other hand, under load there is an excessive increase in pressure of the tooth flanks.

Accordingly, the invention relates to the problem of developing a device of the type in question in such a way that the curvature of the tooth flanks will be improved, and can be varied within broad limits.

This problem is solved according to a preferred embodiment device of the invention in that the supplementary motion occurs on an elliptical trajectory. Preferably the position of the trajectory will be so selected that the major axis of the ellipse will be essentially parallel to the longitudinal direction of a tooth that is to be ground. It is recommended that the position of the axis of the trajectory be adjustable with reference to the tooth that is to be ground. Advantageously moreover, the device will be such that the lengths of the main axes of the trajectory will be adjustable.

The invention proceeds from the knowledge that the configuration of the supplementary motion will be reflected in the configuration of the tooth surface that is ground. In other words, with a device according to the invention an essentially elliptical course of the tooth flank in the long direction of the tooth will be obtained. With this there are various important advantages. With an appropriate layout of the elliptical supplementary motion, the curvature of the tooth surfaces that results from the supplementary motion and the grinding disc curvature with a constant grinding disc radius can be varied in a broad range that extends essentially from zero to $\infty$ without any essential influence upon tooth thickness. In other words, with a variation of the supplementary motion the tooth thickness can be retained, when with a slight change of the grinding disc radius, the main radius of the ellipse can be pronouncedly varied. If as explained the trajectory is so designed that the major axis of the ellipse runs in the longitudinal direction of the tooth, the resulting curvature in the middle of the tooth is minimal but is more and more pronounced toward the tooth ends. This leads to an extended bearing diagram even in the no load state.

Because of the elliptical characteristic, the tooth will however be taken back more pronouncedly at the ends, so that even under load the bearing diagram will not wander to the ends of the teeth, and edgewise bearing can be acceptably avoided. This situation is favorable for noise behavior, especially in the state where there is no load or only a slight load, where generally gear noise has a particularly unpleasant effect. At the same time this elliptical curvature is favorable for load and transmission behavior under load because the Hertzian pressure of the tooth flank under increasing load increases less than it would in the case of arcuate curvature. The bearing diagram is less in any case with errors of assembly than in the ideal assembled state, but it does not wander so quickly to the edge of the tooth as in other forms of curvature. For an ellipse with the major axis a and the minor axis b there is the main radius of curvature of course in the region of the minor axis $\rho = a^2/b$. With suitable selection of main axes a and b, various ellipses can be set, with the result that contacting concave and convex flanks not only are intimately applied to each other, but in the point of contact they even have the same radii of curvature and only lift off from each other toward the ends of the teeth.

The use of the device according to the invention is shown to be particularly advantageous if—as previously noted—one gear of a pair of toothed gears is ground with a cup grinding disc with external conical ring and the counter gear is ground with a cup grinding disc with inner conical ring. Thereby right and left flank of both gear and counter gear respectively can be ground with essentially complementary tools (whereof in other words one consitutes the negative of the other), whereby as required essentially different curvatures can be produced.

It is further an advantage that the velocity in trajectory of the supplementary motion in the weakly curved region of the trajectory of the minor axis and hence the speed of advance of the grinding disc on the workpiece is relatively great. On the contrary, the velocity in trajectory in the region of the major axis is slight so that there are only slight mass forces occurring in the supplementary motion.

Yet another advantage arising from the additional motion is that the danger of grinding burns is greatly reduced. During grinding without additional motion the grinding flanks of the cup wheel remain in the direction of the circumference along a line, known as the generator, so that one grinding stroke can move over the whole width of the tooth in one engagement, with the workpiece held in position. This leads to a considerable danger of burning and ripping during the grinding, so that grinding can be carried out only at a low rate of feed. If, on the other hand, when grinding is carried out with the cyclic additional motion as explained, then the contact between gear wheel and grinding disc is reduced from a contact line to a closely localized contact region, so that the danger of grinding burns and grinding ripping is reduced, i.e. work can be carried out at a higher rate of feed.

The additional cyclic motion, combined with the method of working as explained in accordance with the invention, leads not only to a substantial improvement of the meshing of the toothed wheels, but also to a favorable influence on grinding burns by means of the corresponding variation in closeness of fit between tooth flanks and grinding flanks especially also of the sunken bevel inner ring. In addition, the convexity, and with it the bearing area, can be changed in an advantageous manner in that the grinding disc is disposed so as to be movable in the direction of its axis, so that it grinds on a diameter which can be selected.

The ratio between cutting speed and feed speed of the grinding disc lies preferably between 30:1 and 60:1, where the feed is defined as the motion of the contact point of grinding disc and wheel in the direction along the tooth. Further, it has shown itself to be advantageous for the cutting motion and the additional motion of the grinding disc to be arranged in directions opposite to each other, thus grinding in contrary motion. Grinding in contrary motion is known in itself, but has no advantage in current grinding procedures. On the other hand, within the frame work of the invention, there is the advantage that higher feed quantities (rate of removal of materal) are possible than with grinding with the same path.

In a device according to the invention, the cup grinding disc is connected in the customary way to a grinding spindle that is driven in rotation by a drive motor. Here the drive motor must not execute the supplementary motion also, but must be disposed in a stationary manner. This is achieved according to a preferred embodiment of the invention in that the grinding spindle presents a connecting slit in the face that is turned toward the drive motor, and the drive motor is disposed to be fixed on the device, engaging the slit with a circulating connector pin. Obviously, the association of slit and pin to grinding spindle or drive motor can be reversed.

The subject of the invention is also a drive with which the elliptical supplementary motion can be produced, for which drive independent protection is claimed. The elliptical drive according to the invention is characterized in that a rod of specific length is swingably borne and rotatably drivable at one end, about a rod axis that is stationary on the device (corresponding to the grinding axis when there is no supplementary motion), while at the other end of the rod there is a pivot arm of specific pivot length that is swingably and rotatably borne about a pivot axis (that consequently moves with reference to the machine frame), the said grinding axis being guided by the free end of the pivot arm. The angular velocity of the pivot arm with respect to the rod is thus opposed and twice as great as the angular velocity of the rod with respect to the device. In other words, the angular velocities of rod and pivot arm are opposedly equal with respect to a system of coordinates fixed with respect to the machine. Form and size of the elliptical trajectory of the grinding axis are determined by the lengths of the rod and pivot arm. Advantageously at least the length of pivot is made adjustable. If the pivot length is less than the rod length, the grinding shaft turns in the same direction as the pivot shaft. If the pivot arm is longer than the rod, the grinding shaft rotates in the direction counter to that of the pivot shaft. Hereby it is possible, merely by a change in the length of the pivot arm, to reverse the direction of advance of the grinding disc attack on the workpiece, and thus in a simple way to go over from unitary direction to counter direction grinding.

The drive of the pivot arm is effected with a particularly advantageous form of embodiment, by a pinion rotatably borne on the rod, which on the one hand meshes with a standing gear fixed to the device and on the other hand with a pivoting gear that is rigidly connected with the pivot arm, whereby the standing and pivoting gears present corresponding external or internal toothing and the overall gear ration from the standing to the pivoting gear is 2:1. The corresponding design of the standing and pivoting gears with external or internal toothing leads to the described rotation of rod and pivot arm in the same direction. The indicated gear ratio is attained in that the pinion is made as a double pinion, whereby the single pinion that is connected so as to be fixed in rotation, as well as the standing and pivoting gears, have different numbers of teeth. The position of the main axes of the trajectory can be turned, in that the standing gear can be turned and clamped with reference to the device.

An especially advantageous form of embodiment of the described ellipse drive is produced in that the rod is formed by an outer sleeve that is rotatably borne at its outer periphery in the frame of the machine, in that the pivot arm is formed by an internal sleeve that is rotatably borne on its outer periphery inside the outer sleeve and is eccentrically borne with reference to the axis of rotation of the outer sleeve, and in that the cup grinding disc, with an off-center axis with respect to the axis of rotation of the inner sleeve, is borne in the said inner sleeve. The axis of rotation of the outer sleeve thereby corresponds to the rod axis, and the axis of rotation of the inner sleeve that is off center with respect to the rod axis corresponds to the pivot axis.

The lengths of the rod and the pivot arm are correspondingly given by the eccentricities of the outer and inner sleeve. The pivot gear is connected with the inner sleeve so as to be fixed in rotation, and the pinion is rotatably borne on the outer sleeve. This form of embodiment makes it possible, with technically feasible dimensions that correspond to operational loads, which dimensions naturally have to be relatively large, to set the necessary small eccentricities in a simple and acceptable way. A variation of the length of the pivot arm is made possible in that the inner sleeve comprises two off-center sleeves that enclose one another, which sleeves can be guided toward each other on peripheral surfaces that are off center with reference to the outer periphery of the outer eccentric sleeve and to the grinding axis, and that can be rotated and clamped with reference to each other. In a corresponding way the lengths of the rod may also be varied.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIGS. 6a–g illustrate a number of examples for the path followed during a secondary cyclic motion.

FIG. 7 shows in principle a drive to produce an elliptical supplementary motion;

DETAILED DESCRIPTION OF THE PREFERRED EMBODIMENTS

Figure 1:
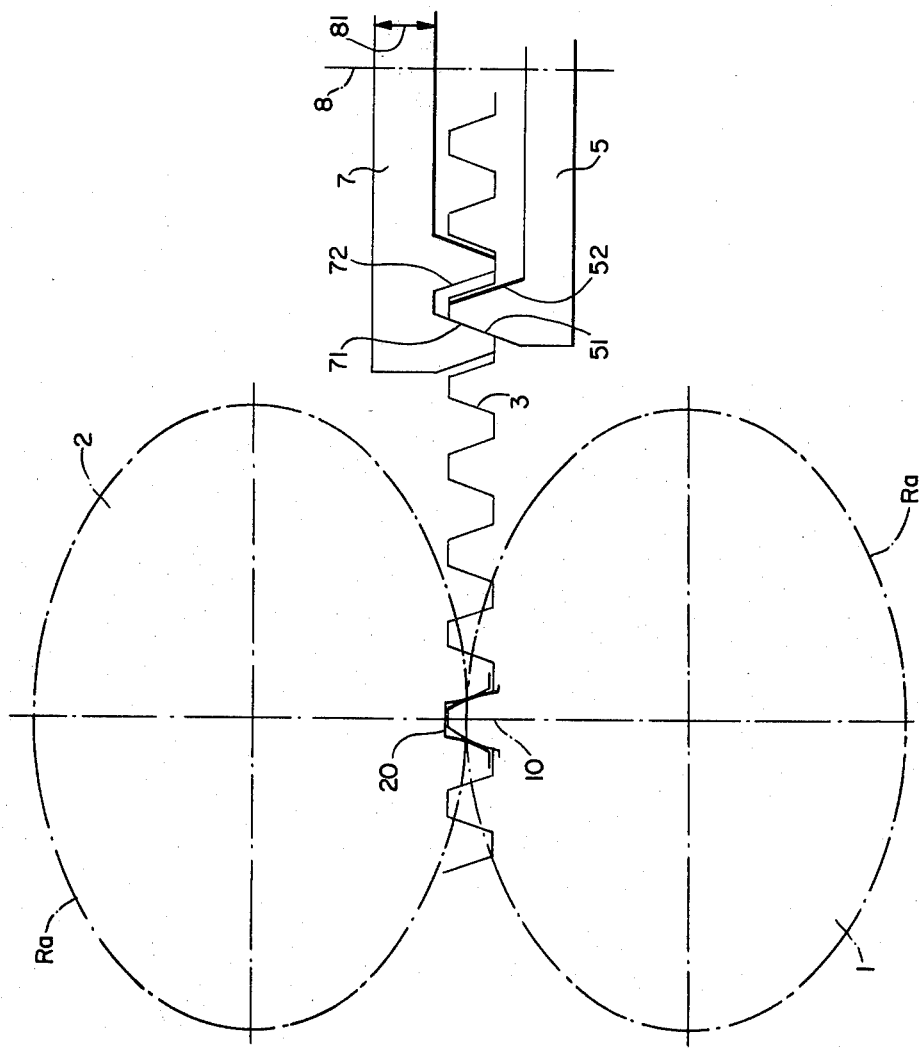
FIG. 1 is a schematic illustration of the interlocking relationships of a pair of wheels, and the interlocking relationships between the grinding disc and the wheel.
Figure 1A:
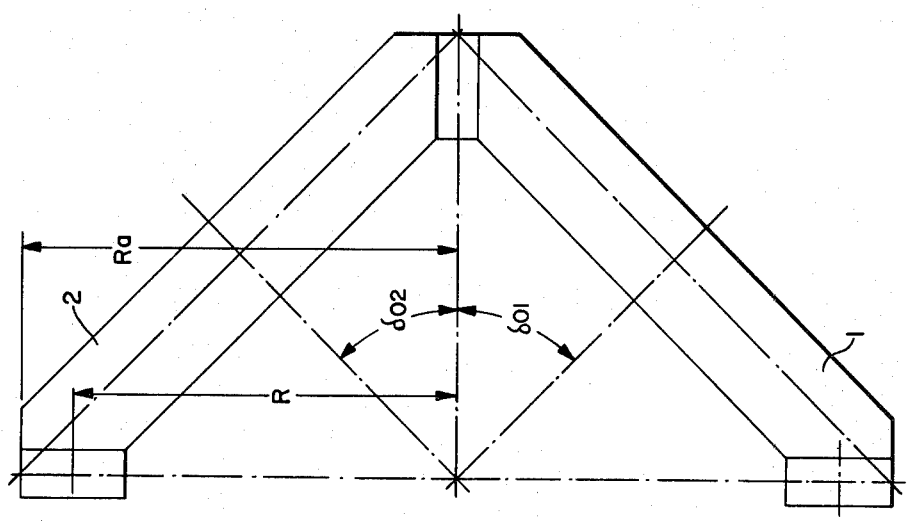
FIG. 1a is a schematic cross-sectional view of a beveled wheel.

Referring now to the drawings, FIG. 1 shows a pair of gear wheels with two intermeshing bevel gears 1 and 2 having spiral teeth. A seen with reference to FIG. 1a, each wheel 1, 2 has the same constant length R for the bevel, while the angles of bevel of the two wheels are denoted by $\delta_{01}$ and $\delta_{02}$, respectively. Finally, both wheels have an outer bevel length Ra. In addition, in the example illustrated the tooth height is independent of the bevel length R.

Figure 2:
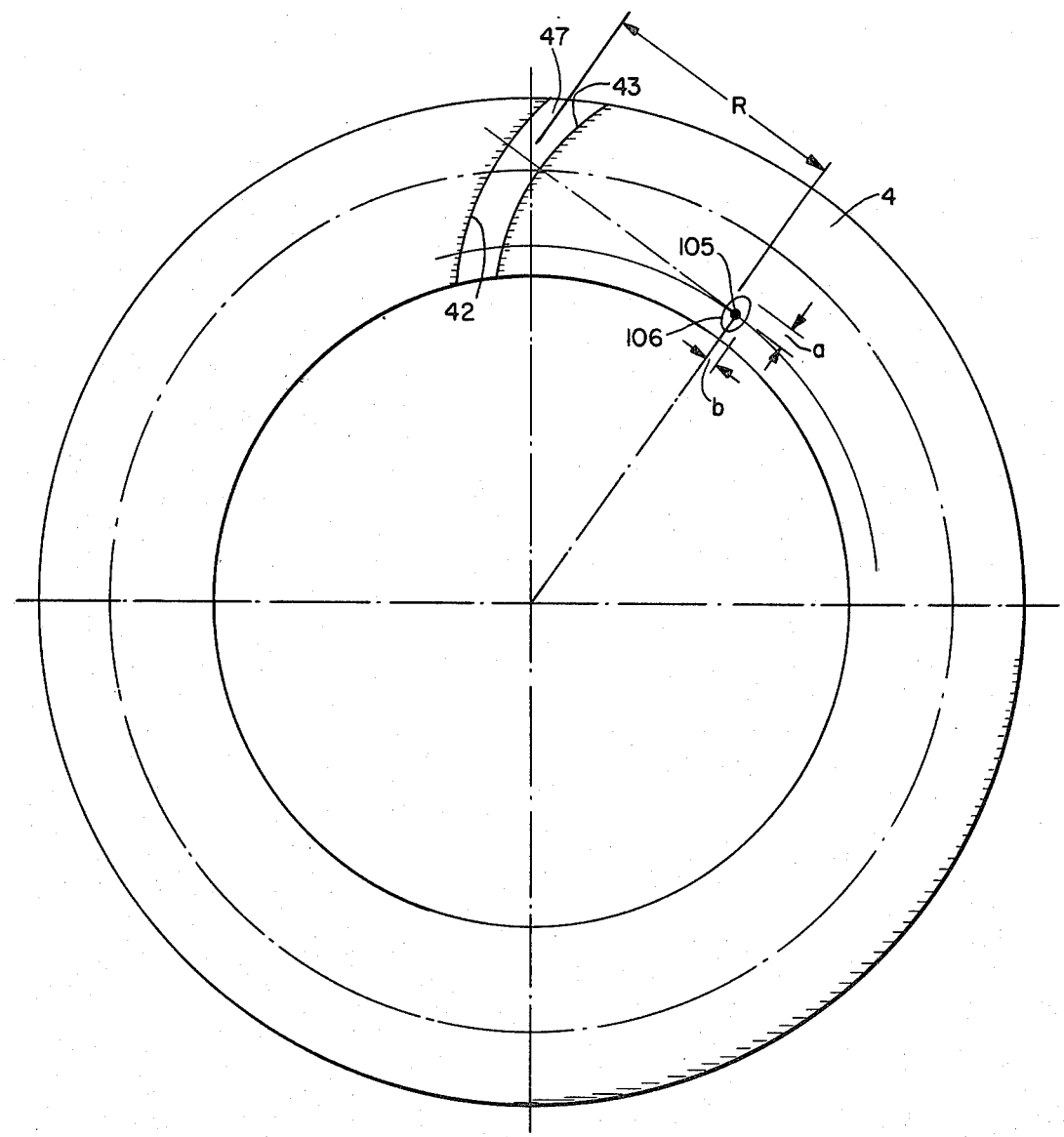
FIG. 2 shows a bevel wheel in the idealized from of a crown wheel.
Figure 3:
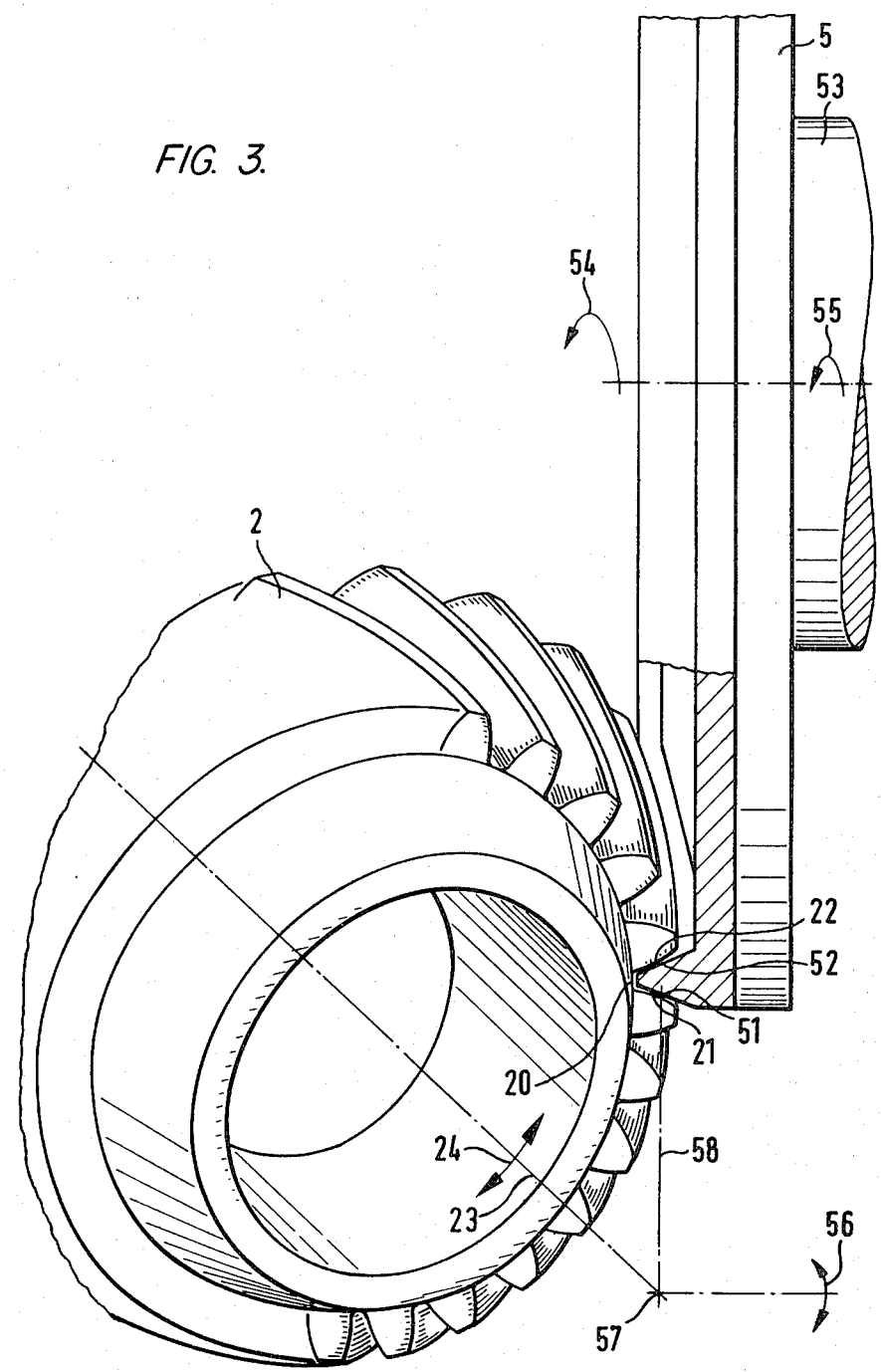
FIG. 3 is a perspective view of the bevel wheel to be ground with the grinding disc shown in partial section.

The outer peripheries of circles Ra are shown projected onto the plane of the drawing and are consequently shown as ellipses (in dotted lines on the drawing FIG. 1). One tooth 10 of wheel 1 and one tooth gap 20 of gear wheel 2 are shown. If the two wheels mesh with each other, an idealized plan may be imagined, in which the teeth have straight flank lines, which mesh simultaneously with both wheels and whose points of contact in all positions of generation with the two wheels 1, 2 are also simultaneously the points of contact of the two wheels one with another. This form of tooth arrangement—known as the ideal crown wheel—is developed as tooth projection 3 between the two wheels 1,2. This ideal tooth arrangement of the bevel gear has an outer radius equal to the outer bevel length R and an angle of bevel of 90°—and therefore a doubled angle of bevel of 180°. FIG. 2 is a view from above of the ideal crown wheel 4 appertaining to the two wheels, in which the flank lines which limit a tooth gap 47, in this case 42, 43, are represented by arcs of circles. In the known method of grinding bevel wheels the working tool takes the form of a cup-shaped grinding disc 5, as shown at the right hand side of FIG. 1. With this grinding disc, whose grinding flanks 51, 52 form a conical outer, or "external" ring, the right and the left flanks of a tooth gap 20 of one gear wheel 2 are produced as seen in FIG. 3. If this tool is also used in the production of the tooth gap of the other gear wheel 1, the right hand and left hand flanks of such gap must be produced in separate processes, otherwise the mid-points of the flank lines of the right hand and left hand flanks of the tooth gap of the wheel and counter wheel would not coincide.

Figure 4:
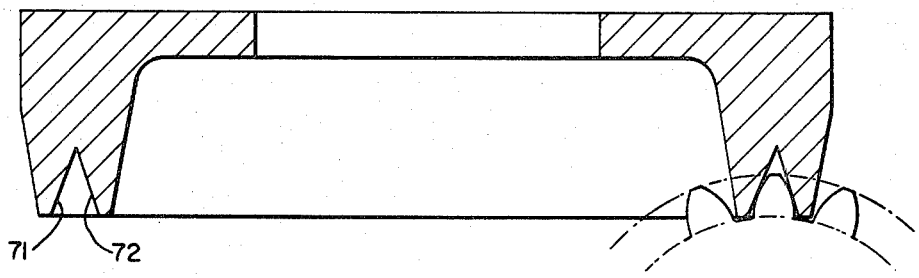
FIG. 4 shows a cross-sectional view through a grinding disc for a counter-wheel in association with a partial schematic illustration of said counter wheel.

Accordingly, in accordance with the invention, the counter-wheel is machined by a cup-wheel 7, FIG. 1, whose conical grinding flanks 71, 72 are inclined towards each other and form a hollow sunken conical inner, or "internal," ring. In this regard, while grinding discs 5 and 7 are shown together in FIG. 1 in conjunction with idealized projection 3, this is merely for the purpose of illustrating their relationship thereto since they are never both utilized in formation of a single toothed wheel. By this means it is possible to machine the counter-wheel also in one operation. In addition, it is shown how the grinding discs 5 and 7 have the same axis 8 with respect to the crown wheel used. While the grinding disc 5 grinds the tooth gap 20 of wheel 2 by means of the grinding flanks 51, 52, the flanks of tooth 10 of counter-wheel 1 which mesh with such tooth gap 20 are ground by means of the grinding disc 7, (see FIG. 4), each in one operation. The grinding disc 7 with its spindle can be displaced in the direction of axis 8 in accordance with arrow 81, so that the disc grinds on another diameter. Hence the convexity may be varied.

FIG. 3 shows a practical aspect of the method as applied to the grinding of wheel 2. The grinding disc 5 with the flank profile 51, 52 rests in the form of a conical outer ring on the spindle 53, which rotates in direction 54. This rotary motion is the cutting motion of the grinding disc. The gear wheel 2 to be ground rests on an axle 23 arranged for this purpose, i.e., a driving shaft, and executes an oscillatory rotary motion—the gear-generating motion—in the direction of the double arrow 24. The grinding disc 5 executes, in addition to the cutting motion 54, a reciprocating motion 56 adapted to the motion 24 of the bevel gear, for the production of which a component is used which moves the grinding disc in a cyclic motion about the intersection 57 of axle 23 of the wheel 2 with the center line 58 of the tooth height. As shown in FIG. 3, tooth gap 20 of the bevel gear is being ground, and the flank 21 (below this in the drawing) is being machined by the outer grinding flank 52. This leads to machining of one of the flanks 21 or 22 from the outside inwards, and that of the other flank from the inside outwards, always while the wheel is reciprocating in one or other of the directions of the double arrow 24.

On the rotary or cutting motion 54 of the grinding disc 5, corresponding to the grinding disc 7, there is superimposed an additional cyclic motion 55 of small eccentricity which is transmitted either from the grinding disc 5 through grinding spindle 53, or directly from grinding spindle 53. This additional motion 55 is shown in FIG. 3 for simplicity and comparison purposes even though it applies to disc 7 and not to disc 5. This additional motion is further explained by means of the ideal crown wheel 6 shown in FIG. 5, in which the cutting lines of a tooth gap are indicated by 61 and 62. The flanks of the tooth gap are produced by a grinding disc, not shown in the figure, of outer radius $r_a$ and inner radius $r_i$, which turns about axis 63. Again this rotary motion is the cutting motion. In addition the grinding disc executes a cyclic motion, which is circular in the aspect of the invention illustrated here, whose orbit is indicated by 64 in the drawing. Both motions take place in the direction of the arrow 65. In this regard, this circular cyclic motion corresponds to that of the above-noted U.S. Pat. No. 3,127,709; however, this patent relates to the use of a male grinding wheel, such as disc 5, and not to the use of a female grinding disc such as disc 7.

In connection with female grinding disc 7, the following additional points are noted. Firstly, while milling cutters having a configuration similar in cross section to that shown in FIG. 4 (i.e. having a female shape with mutually facing flanks 71, 72) were proposed long ago for milling cutters, (see FIG. 10, U.S. Pat. No. 1,676,371), such has been heretofore unknown for grinding discs, and as best can be determined never ever became accepted for pratice in the milling arts. Furthermore it is pointed out that application of this milling tool concept has posed significant problems that augured against its application to the grinding art and explain the fact that said patent proposes the use of a differently configured tool in accordance with its grinding methods.

One such problem is that of how a grinding tool having such a shape could be dressed. This problem has been solved by the present applicant as described in his published German application (Offenlegungsschrift) No. 28 34 149 and corresponding U.S. application Ser. No. 200,001, filed Oct. 23, 1980 While specific solutions to the dressing problem do not form part of the present invention, to the extent that the subject matter of these applications is necessary to complete an understanding thereof, said applications are hereby incorporated by reference.

This aspect of the present invention also differs from that of U.S. Pat. No. 1,676,371 with regard to the configurational relationship between the male and female tools used. That is, the male and female tools used to form complementary tooth surfaces are designed to interfit exactly and no supplemental cyclic motion is imposed thereon. On the other hand, in accordance with a preferred feature of the present invention, the female profile defined by surfaces 71, 72 of disc 7 is not congruent to that defined by surfaces 51, 52 of discs 5, but rather is slightly different by an amount equal to the amount of the above-noted secondary motion of the grinding disc 7 that is effective in the direction of the tooth normal. Thus, in practicing this aspect of the invention the grinding disc 7 selected for use will depend in part upon the nature of the additional cyclic motion that will be imposed thereon.

The radius of curvature of the concave tooth flank is the sum of the radius $r_a$ of the grinding disc and the radius of the additional motion. The cutting line of this concave form is likewise an arc of a circle. The concave tooth flank has in this plane only approximately the form of an arc of a circle, since the two motions overlap along the radius $r_i$ and the radius of the additional motion. The curvature of this tooth flank corresponds approximately to the reciprocal of the radius $r_i$ and is larger than this reciprocal by a negligible amount. If the wheel and the counter wheel are produced with a grinding disc, as described in FIGS. 1, 3 and 4 as appropriate, and if either both or only one of the working tools are subjected to such an additional motion, an advantageous convexity is produced, leading to a restricted lateral force and thus favorable displacement properties of the wheel. In addition the wheel and the counter-wheel can be produced in one process. Contact between grinding disc and workpiece takes place not only along a contact line, which lies essentially in the cutting direction of the grinding disc, but, on superimposition of a reciprocating motion, theoretically in a single point, but actually over a relatively small contact surface, on account of the cutting adjustment during grinding. The size of this contact surface depends with regard to the engaging surfaces on the magnitude of the adjustment and on the ratio of the curvatures of the grinding disc and the additional motion.

Figure 5:
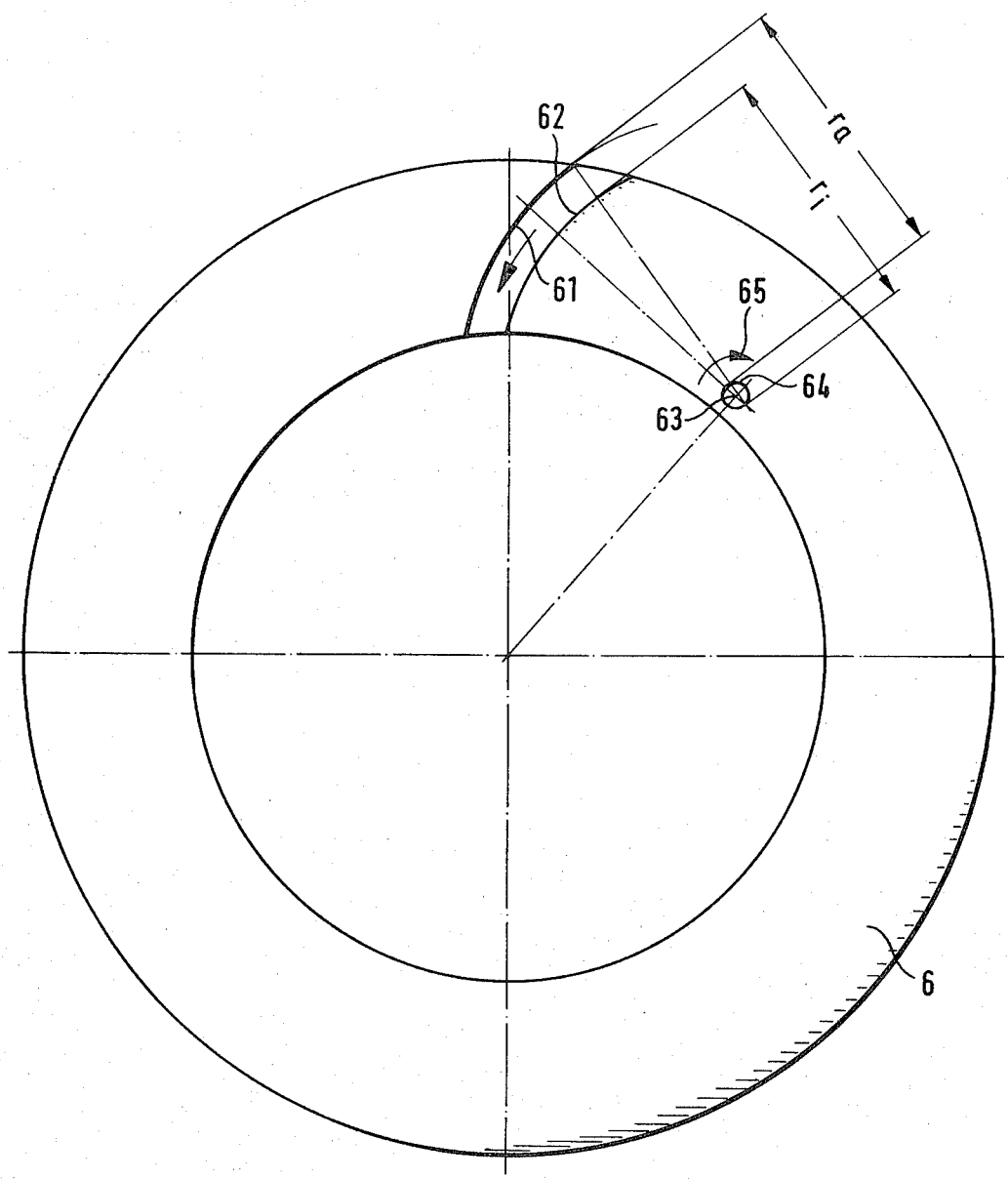
FIG. 5 shows a bevel wheel in the idealized form of a crown wheel, showing the geometry and kinematics of the grinding wheel.

A further advantage of this procedure is seen in FIG. 5. In the arrangement of the additional motion indicated, the contact zone wanders on the concave flank from the outer end of the tooth to the inner end of the tooth, and on the convex flank from the inner end of the tooth to the outer end of the tooth. Due to the form of the additional motion and the limited length of the contact surface between grinding disc and wheel being produced, the effect of heating on the wheel during grinding, and hence the risk of grinding burns, is reduced.

Various different forms of producing the additional motion are diagrammatically shown in FIGS. 6a–g. FIG. 6a shows the circular path which has already been explained. 6b shows another cyclic curve, in which two sections of circular arcs, of different radii, are combined. While during a circular additional motion in accordance with 6a there is a large proximity time, this time is reduced by use of a form of additional motion in accordance with 6b. In addition there is a larger variation in width on selection of the desired convexity.

With path of the motion 6c, there is a displacement at the end positions, which has a component of motion in the direction of the circumference of the wheel. By this means a balancing of the play between the thickness of the grinding disc and the width of the tooth gap can be effected.

Finally, the mid-points of the additional motion can be selected as desired as is shown in 6d-g. By this means a favorable influence of the position of the bearing surface on one tooth flank is possible, independent of the position of the bearing surface on the other tooth flank.

However, the most preferred trajectory and the means for attaining same is as follows. FIG. 2 shows a view of the ideal planar gear 1 that is to be ground to form a pair of tapered gears, whereof one is to be ground. What is involved is an arcuate toothing, so that flank lines 42, 43 that limit the tooth gap 41 that is to be ground are shown as arcs. The cup grinding disc with which the grinding is executed is not shown in this figure but the middle radius R of the cup grinding disc is shown. The grinding axis 105 of the cup grinding disc is not fixed to the machine in the grinding process, but it undergoes a cyclic supplementary motion whose trajectory 106 has the configuration of an ellipse and lies in a plane perpendicular to axis 105, hence in the plane of the drawing of the figure. The elliptical trajectory 106 with major axis a and minor axis b is much exaggerated in size, for the sake of clarity. It is to be recognized that the major axis a lies essentially parallel to the longitudinal direction of tooth gaps 47.

FIG. 7 shows the principle of the kinematic relationships in a drive wherewith the elliptical trajectory 106 can be precisely represented. A rod of length k is rotatable about an axis M fitted on the machine. At the free end of rod k there is a pivot arm with pivot length e (two different examples e', e" being shown) that is rotatably articulated so as to rotate about pivot axis O. With rotation of rod k about axis M at an angular velocity w, pivot axis O describes a circular trajectory. By suitable means that are not to be discussed here, it is provided that pivot arm e will turn about axis O at an angular velocity $\epsilon$ which is counter to angular velocity w of rod k, and twice as great. Analysis shows that any point of pivot arm e, especially therefore grinding axis N that is indicated at its free end, will describe an ellipse. The main axes of all these ellipses intersect in rod axis M. In the case in which e=0, the ellipse changes to a circle with radius k. When e=k a straight line with length 2k develops as the ellipse major axis extending out from rod axis M. Pivot axis O and grinding axis N run in the same direction in the case in which e<k, and in opposite direction when e>k.

Figure 8:
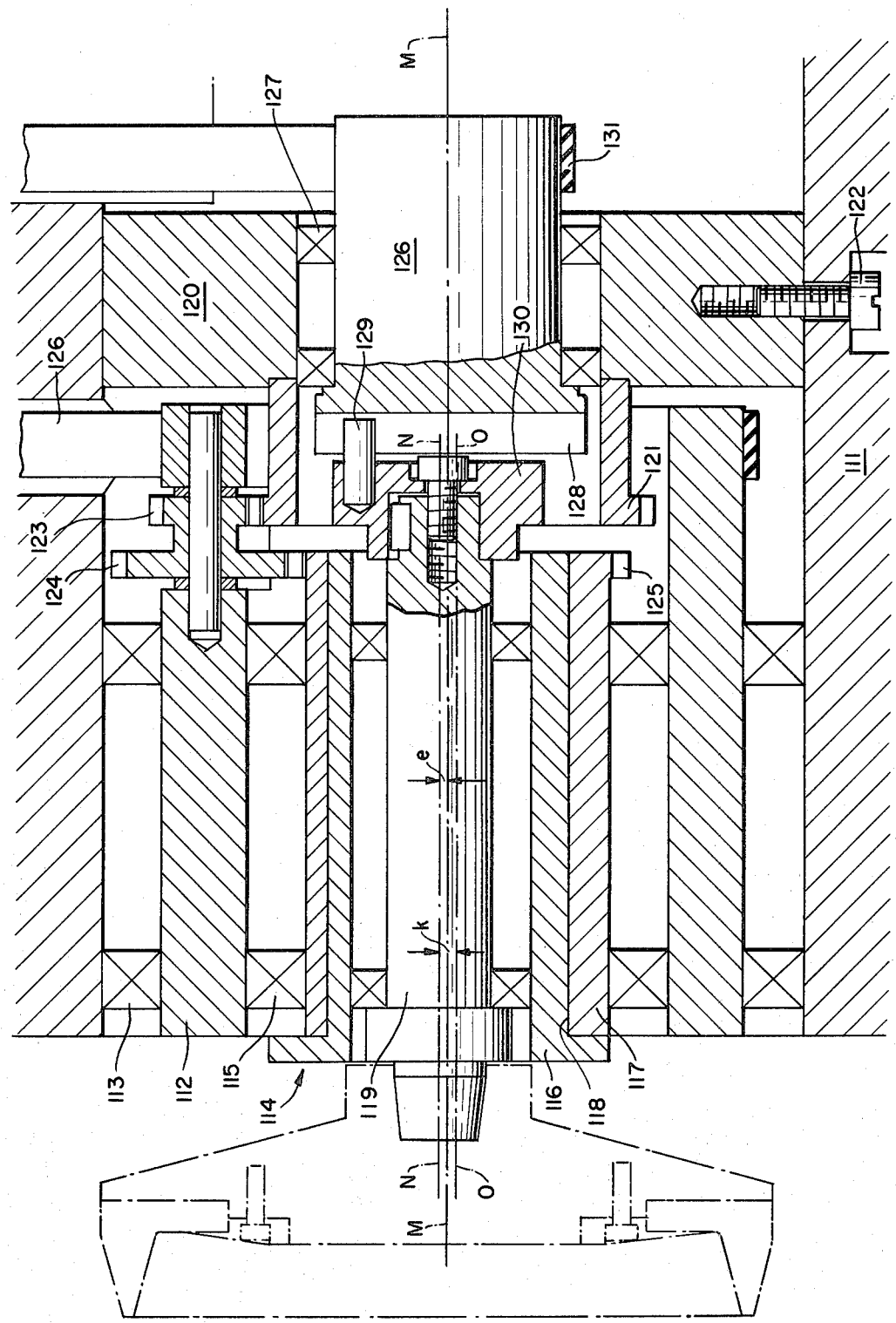
FIG. 8 shows a drive to produce an elliptical supplementary motion, in longitudinal section.
Figure 9:
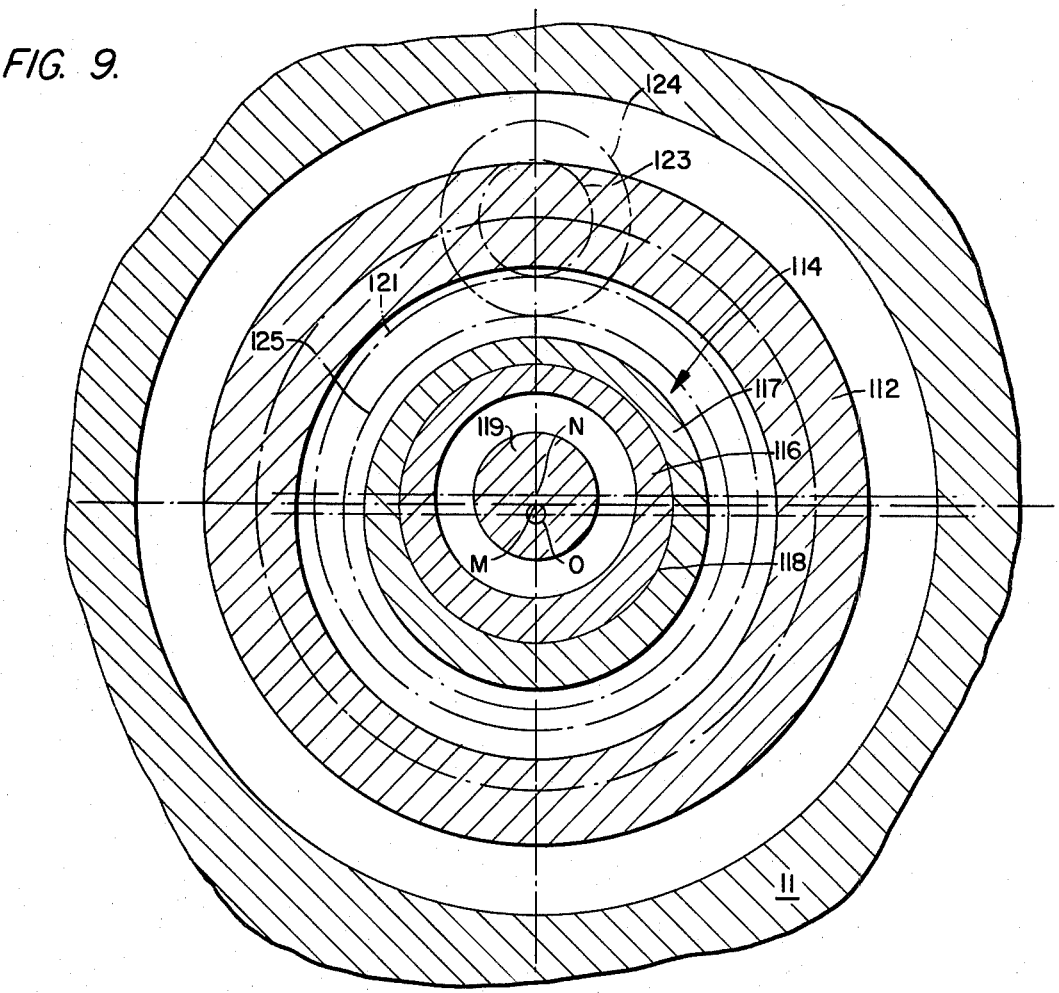
FIG. 9 shows the subject of FIG. 8 in cross-section.

FIGS. 8 and 9 present a concrete example of the elliptical drive discussed with reference to FIG. 7. In machine frame 111 an outer sleeve 112 is borne rotatably about an axis M—M, by means of ball bearings 113 at its outer periphery. Axis M—M, in the kinematic sense of the previous explanations, represents the rod shaft. An inner sleeve 114 is eccentrically borne with reference to axis M—M, so as to rotate about an axis O—O by means of ball bearings 115 on its external periphery, inside outer sleeve 112. Axis O—O corresponds to the pivot axis described above. The eccentricity of outer sleeve 112 corresponds kinematically to length k of the rod that was described, and it is indicated in FIG. 8.

Inner sleeve 114 comprises an inner eccentric sleeve 116 and an outer eccentric sleeve 117 that encloses the inner one. The two eccentric sleeves 116, 117 are set one inside the other and are guided toward each other and are oppositely rotatable on cylinder surfaces 118 that are eccentric with reference to the outer periphery of outer eccenter sleeve 117 and therewith to pivot axis O—O. In the interior of this double eccentric that constitutes inner sleeve 114, the grinding spindle 119 is rotatably borne in such a way that the grinding axis N—N is coaxial to the inner periphery of inner eccentric sleeve 116 and eccentric with respect to cylinder surface 118. The adjustable eccentricity of inner sleeve 114 that can be adjusted by opposed turning of sleeves 116, 117 kinematically corresponds to length e of the pivot arm, and is indicated in FIG. 8. In the illustrated example the eccentricities of outer sleeve 112, inner eccentric sleeve 116 and outer eccentric sleeve 117 are equal.

A stationary toothed gear 121 is fixed on a ring 120, coaxially to rod axis M—M. Ring 120 and therewith gear 121 is rotatable in machine frame 1 and clampable by means of a clamping screw 122, in any position. On outer sleeve 112 there are rotatably mounted two pinions 123, 124 that are fixed to rotate with each other. A pivoting toothed gear 125 is fixed to be rotatable with inner sleeve 114 and coaxial to pivot axis O—O. The device is of such design that stationary gear 121 meshes with pinion 123 and pivoting gear 125 meshes with pinion 124. The tooth numbers are such that from gear 121 to pivoting gear 123 there results a gear ratio of 2:1. Outer sleeve 112 is driven in rotation by means of a belt 26 at an angular velocity w. By means of the described gears and pinion the inner sleeve 14 is set into rotation with an angular velocity $\epsilon$ that is double that of outer sleeve 112, and in the opposite direction. Grinding spindle 119 consequently is subjected to an elliptical supplementary motion and at the same time it is freely rotatable because of its ball bearings inside inner sleeve 114.

The rotary drive of grinding spindle 119 does not occur directly in this example, from the drive motor (not illustrated), but rather via a special drive member in the form of a pin 126 that is rotatably borne in ring 120 by means of ball bearings 127. On its front face, pin 126 presents a connecting slit 128. A connecting pin 129 is set in a flange 130 that is fixed in rotation with grinding spindle 119. Thereby the movement of rotation can be taken, independently of the set eccentricity, from pin 126 to spindle 119. Pin 126 in turn is driven in the usual way, e.g. by a belt 131, from the drive motor.

Any radius of curvature between zero and $\infty$ can be set with the above described elliptical drive. Radii of O to k are produced in the auxiliary vertex, and from k to $\alpha$ in the main vertex of the ellipse. By turning gear 121 by means of ring 120 with reference to machine frame 111, the position of the major axes of the ellipse can be turned, and especially so adjusted that—depending upon the desired radius of curvature—one of the two main axes will lie in the longitudinal direction of a tooth that is to be ground. Thereby, simply and with little outlay, changes can be made in the position of the bearing diagram of a ground tapered gear.

Figure 10:
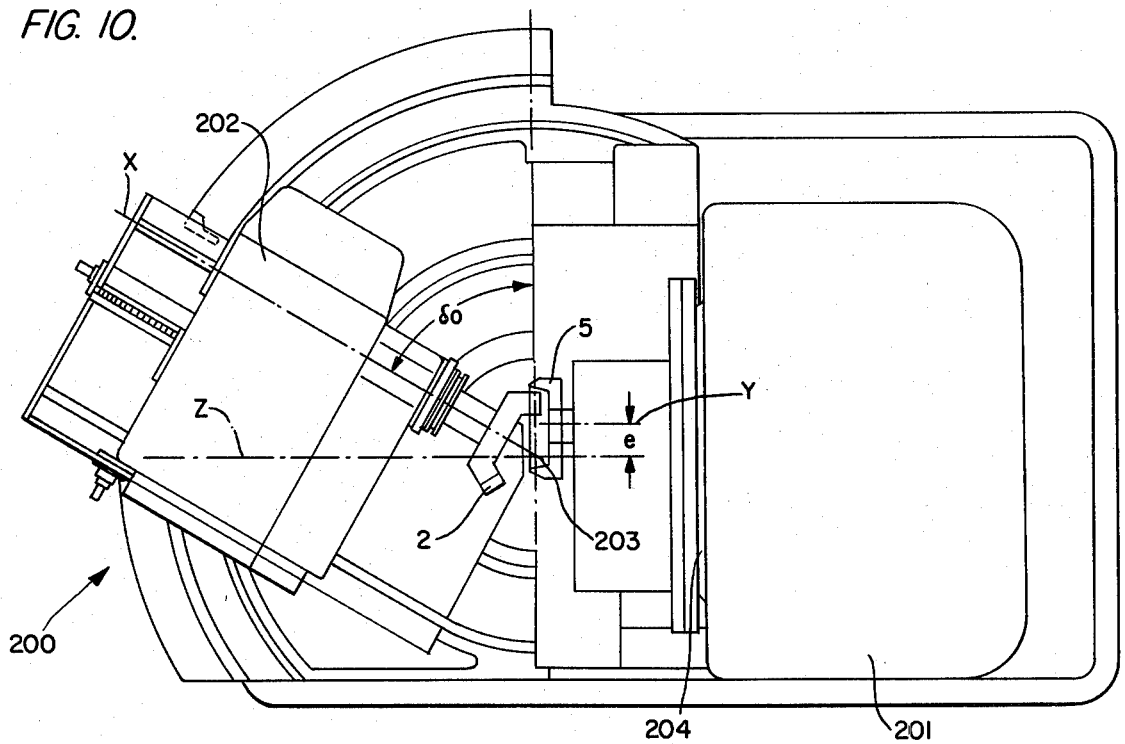
FIG. 10 shows a grinding machine of the type to which the inventive drive is applicable.

FIG. 10 schematically illustrates a gear grinding machine 200 of a known type (Gleason, Hypoid Grinder, see, for example, German Pat. No. 852,030) that can be utilized for the practice of the present invention by being modified with the above-described drive and equipped with the above-described grinding discs. With reference to this figure, numeral 201 is the grinding tool support and tool drive housing, 202 is the indexing head for the bevel gear workpiece, 203 is the center of the machine 200, 204 is the generating member of the tool support 201, and x,y, z are center axes of the gear 2, tool 5 and tool support 201, respectively.

The workpiece (bevel gear) 2 is mounted on the shaft of the so-called index head 202, and the grinding wheel 5 or 7 is on the generating member 204 of the tool support 201. The axes of the index head 202 and y of the generating member 204 meet in the center of the machine 203. The grinding wheel is displaced from the center of the generating member by the amount e depending on the gear tooth data and the angle of inclination of the bevel gear. The generating member 204 and an index head shaft for rotation of the workpiece 2 are conventionally connected via a gear train within the machine, so that an octoid tooth system is produced by the rotation of the generating member and the index head shaft. The octoid is an approximated shape of a spherical involute. In a deviation from heretofore known machines for grinding bevel gears, noted above, the index head in our process is pivoted to the conical index angle $\delta_0$ so that a theoretically exact tooth system is produced.

The production of a gear wheel with machine 200 may take place according to the present invention by an index hobbing process. In a hobbing process the tooth shape (customarily an involute in case of a spur gear) is produced by hobbing with a linear-flanked tool. The principle of index—hobbing grinding for a spur gear is itself known and is described, for example, in an article co-authored by the present applicant with Willi Hofler entitled "Fine-Machining of Gear Wheels By Tooth Flank Grinding" (Antriebstechik 11, 1972, No. 3) and in FIGS. 1, 2 and 3 thereof, for a specific spur gear grinding method. The tooth shape is produced by hobbing. The working step is executed for each tooth gap or each tooth as described above. After the tooth form has been generated, the tool is disengaged and indexed further to the next tooth. By the combination of indexing and hobbing, the term index-hobbing process has been coined.

The method of working as explained is especially advantageous for grinding precision gears, e.g. in machine tool production, press construction, fast-moving drives, and in aircraft production. The preliminary formation of the teeth is, in general, carried out by milling, after which the wheels are hardened and then ground. In mass production, e.g. for lorries, the preliminary formation of the teeth may be by precision forging, after which the wheels are hardened and then ground. Further, it is possible for one wheel—usually that with the greater number of teeth—to be produced by grinding to shape, and for the counter-wheel to be machined in accordance with the procedure explained.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Apparatus for use in grinding pairs of at least one of spiral and curved tooth bevel gears, the apparatus comprising a cup grinding wheel mounted for rotation about a grinding axis, the cup grinding wheel having two rectilinear grinding flanks that are linear in cross section and inclined relative to each other to form a tool with a conical ring, and means for applying a slight eccentric elliptical cyclic motion to the cup grinding wheel during a grinding operation.

2. Apparatus as claimed in claim 1, wherein the grinding disc is adapted to be displaced in the direction of its axis.

3. Apparatus as claimed in claim 2, characterized in that ratio of cutting speed to feed speed of the cup wheel lies between 30:1 and 60:1 where the feed is the motion of the point of contact along the tooth.

4. Apparatus as claimed in claim 2, characterized in that the cutting motion and the feed motion of the grinding disc are in opposite directions.

5. Apparatus as in claim 1, comprising a grinding spindle that supports the grinding wheel and is driven in rotation by a drive motor, characterized in that the grinding spindle presents a connector pin in a frontal surface turned toward the drive motor, and in that the drive motor or a drive member fixed to the apparatus has a connector slit in which the said connector pin engages.

6. Apparatus according to claim 1, wherein the grinding flanks of said grinding wheel are inclined towards each other to form a female grinding tool.

7. Device for use in grinding pairs of at least one of spiral and curved tooth bevel gears, the apparatus comprising a cup grinding wheel mounted for rotation about a grinding axis, the cup grinding wheel having two rectilinear grinding flanks that are linear in cross section and inclined relative to each other to form a tool with a conical ring, and means for applying a slight eccentric cyclic motion to the cup grinding wheel during a grinding operation, comprising a means for producing a kinematic effect equivalent to a rod of specific length borne so as to be pivotable about a rod axis that is fixed relative to the apparatus and rotatably drivable at one end, while at the other end of the rod there is a kinematic equivalent of a pivot arm of specific pivot length that is borne so as to be pivotable about a pivot axis, and is rotatably drivable, and in that a grinding axis of said grinding wheel passes through the free end of the pivot arm kinematic equivalent and in that the angular velocity of the pivot arm kinematic equivalent with respect to the means producing the rod kinematic equivalent is opposed to and twice as great as the angular velocity of the rod with respect to the device.

8. Device as in claim 7, characterized in that at least the pivot length is adjustable.

9. Device as in claim 7, characterized by a pinion rotatably borne on the kinematic rod equivalent, which pinion meshes on the one hand with a standing toothed gear fixed to the device and on the other hand with a pivoting toothed gear rigidly connected with the pivot arm kinematic equivalent, whereby the standing and pivoting gears present corresponding outer or inner toothing, and the total gear ratio from standing to pivoting gear is 2:1.

10. Device as in claim 9, characterized in that the standing gear can be clamped so as to be fixed with respect to the device.

11. Device as in claim 7, characterized in that the kinematic equivalent of the rod is constituted by an outer sleeve that is rotatably borne at its outer periphery on the machine frame, that the pivot arm kinematic equivalent is constituted by an inner sleeve that is rotatably borne at its outer periphery inside the outer sleeve and is borne eccentrically with respect to the axis of rotation of the outer sleeve, and that the cup grining wheel is borne in the inner sleeve with said grinding axis being eccentric with respect to the axis of rotation of the inner sleeve.

12. Device as in claim 11, characterized in that the inner sleeve comprises two eccentric sleeves, one inside the other, that are guided toward each other on peripheral surfaces that are eccentric to the outer periphery of the outer eccentric sleeve and to the grinding axis, and rotatable and clampable with respect to each other.

13. Device as in any one of claims 7-12, wherein said means for applying an eccentric cyclic motion to the grinding wheel is operable to produce an elliptical cyclic motion.

14. A process for the grinding of pairs of at least one of spiral and curved tooth bevel gears using a method of gear generation, the process comprising the steps of producing teeth on each of the gears of the pairs by simultaneous grinding of respective pairs of flanks of the gear teeth by means of a cup grinding wheel having two rectilinear grinding flanks that are linear in cross section and inclined relative to each other to form a tool with one of conical inner and outer rings, and imparting an additional slight elliptical cyclic motion to the cup grinding wheel during said grinding of the flanks of the gear teeth.

15. A process for the grinding of pairs of at least one of spiral and curved tooth bevel gears using a method of gear generation, the process comprising the steps of producing the teeth of one of the bevel gears by simultaneously grinding the flanks located on either side of a tooth gap defining facing sides of adjacent teeth by means of a cup grinding wheel having two outwardly facing grinding flanks facing away from each other for forming a conical outer ring, producing the teeth of the other bevel gear by simultaneous grinding of the flanks located opposite sides of a tooth by means of a cup grinding wheel having two grinding flanks facing one another for forming a conical inner ring, and, imparting an additional slight eccentric cyclic motion to at least one of the cup grinding wheels during the grinding operation, wherein the additional slight eccentric motion is applied to the grinding wheel for producing the other gear, and wherein the grinding wheels are complementarily shaped, but vary from congruety by an amount equal to an amount of said additional eccentric motion that is effective in the direction of the tooth normal.

16. A process as claimed in claim 15, wherein the step of imparting cyclic motion includes moving the at least one cup grinding wheel along a circular path.

17. A process as claimed in claim 15, wherein the step of imparting cyclic motion includes moving the at least one cup grinding wheel along parts having two differing curvatures which are concave with respect to a curvature of the flanks of the teeth.

18. A process as claimed in claim 17, wherein the two arcs of the circle have different centers of curvature.

19. Process as in claim 15, characterized in that the additional motion occurs on an elliptical trajectory.

20. Process as in claim 19, characterized in that the major axis of the trajectory lies essentially parallel to the longitudinal direction of a tooth that is to be ground.

21. Process as in claim 19, characterized in that the lengths of the main axes of the trajectory are adjustable.

* * * * *